US010752168B2

(12) United States Patent
Glickman et al.

(10) Patent No.: US 10,752,168 B2
(45) Date of Patent: Aug. 25, 2020

(54) MOTOR VEHICLE WITH LIGHT ASSEMBLY FOR ILLUMINATING LICENSE PLATE

(71) Applicant: Ford Global Technologies, LLC, Dearborn, MI (US)

(72) Inventors: David Brian Glickman, Southfield, MI (US); Ryan Nicholas Garvey, Detroit, MI (US); Stuart C. Salter, White Lake, MI (US); Paul Kenneth Dellock, Northville, MI (US); Stephen Thomas Kozak, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 155 days.

(21) Appl. No.: 15/913,965

(22) Filed: Mar. 7, 2018

(65) Prior Publication Data
US 2019/0275929 A1 Sep. 12, 2019

(51) Int. Cl.
*B60Q 1/56* (2006.01)
*B62D 43/02* (2006.01)
*B60Q 1/26* (2006.01)
*B60Q 1/30* (2006.01)
*B60Q 1/00* (2006.01)
*F21S 43/14* (2018.01)

(52) U.S. Cl.
CPC ............ *B60Q 1/56* (2013.01); *B60Q 1/2661* (2013.01); *B60Q 1/302* (2013.01); *B62D 43/02* (2013.01); *B60Q 1/0088* (2013.01); *B60Q 2400/50* (2013.01); *F21S 43/14* (2018.01)

(58) Field of Classification Search
CPC ........ B60Q 1/2661; B60Q 1/56; B60R 13/10; B60R 13/105; B62D 43/02–045
See application file for complete search history.

(56) References Cited

U.S. PATENT DOCUMENTS

| 4,676,415 | A | * | 6/1987 | Kennedy | ............... B62D 43/04 224/42.21 |
| 6,923,351 | B2 | | 8/2005 | Roehmer et al. | |
| 8,528,800 | B1 | | 9/2013 | Newbill | |
| 8,540,125 | B2 | | 9/2013 | Newbill | |
| 9,688,192 | B2 | | 6/2017 | Salter et al. | |
| 2005/0094405 | A1 | * | 5/2005 | Tatewaki | ............. B60Q 1/2696 362/341 |
| 2007/0221928 | A1 | * | 9/2007 | Lee | ........................ H01L 33/486 257/79 |
| 2010/0157599 | A1 | * | 6/2010 | Carter | ..................... B32B 37/10 362/249.02 |
| 2010/0163890 | A1 | * | 7/2010 | Miskin | .................. H01L 33/641 257/88 |
| 2018/0191937 | A1 | * | 7/2018 | Frederick | ............... B60K 35/00 |

FOREIGN PATENT DOCUMENTS

| CN | 104566113 A | 4/2015 | |
| JP | 4277881 B2 | 6/2009 | |
| WO | WO-2018007926 A1 * | 1/2018 | ............... B60Q 1/22 |

* cited by examiner

*Primary Examiner* — Isiaka O Akanbi
*Assistant Examiner* — Steven Y Horikoshi
(74) *Attorney, Agent, or Firm* — David Coppiellie; Carlson, Gaskey & Olds, P.C.

(57) ABSTRACT

A motor vehicle according to an exemplary aspect of the present disclosure includes, among other things, a rear bumper including a section configured to support a license plate, a spare tire carrier, and a light assembly mounted to the spare tire carrier. The light assembly is configured to illuminate the section of the rear bumper. A method is also disclosed.

12 Claims, 4 Drawing Sheets

MOTOR VEHICLE WITH LIGHT ASSEMBLY FOR ILLUMINATING LICENSE PLATE

TECHNICAL FIELD

This disclosure relates to a motor vehicle with a light assembly configured to illuminate a license plate, and a corresponding method. In particular, the light assembly is mounted to a spare tire carrier.

BACKGROUND

License plates, which are sometimes referred to as "number plates" or "registration plates," are attached to motor vehicles for identification purposes or for ornamental decoration. In some jurisdictions (such as the State of Michigan), license plates are mounted only to a rear of a vehicle, while in other jurisdictions (such as the State of Ohio) license plates must be mounted to both the front and rear of the vehicle. Motor vehicles are known to include front and rear bumpers with sections configured to support license plates. Vehicles are known to include light assemblies configured to illuminate the license plates, thereby allowing the license plates to be read at night. Such light assemblies are typically mounted to a vehicle bumper immediately above or to the sides of the license plate.

SUMMARY

A motor vehicle according to an exemplary aspect of the present disclosure includes, among other things, a rear bumper including a section configured to support a license plate, a spare tire carrier, and a light assembly mounted to the spare tire carrier. The light assembly is configured to illuminate the section of the rear bumper.

In a further non-limiting embodiment of the foregoing motor vehicle, the spare tire carrier includes a recess, and the light assembly is arranged at least partially within the recess.

In a further non-limiting embodiment of any of the foregoing motor vehicles, the light assembly includes a light source and a lens arrangement, and the lens arrangement is configured to direct light from the light source to the section of the rear bumper.

In a further non-limiting embodiment of any of the foregoing motor vehicles, the lens arrangement includes an outer housing and an optical component configured to direct light from the light source to the section of the bumper.

In a further non-limiting embodiment of any of the foregoing motor vehicles, the light source is a light-emitting diode mounted to a printed circuit board.

In a further non-limiting embodiment of any of the foregoing motor vehicles, the printed circuit board is mounted to the spare tire carrier by way of a polymer having a thermal conductivity of greater than about 10 watts per meter-Kelvin (W/m-K).

In a further non-limiting embodiment of any of the foregoing motor vehicles, the polymer has a thermal conductivity of about 14 watts per meter-Kelvin (W/m-K).

In a further non-limiting embodiment of any of the foregoing motor vehicles, the light source is a first light source, the motor vehicle includes at least one second light source mounted to the spare tire carrier, the spare tire carrier is moveable between an open position and a closed position, the first light source is configured to illuminate the section of the rear bumper when the spare tire carrier is in the closed position, and the at least one second light source is configured to illuminate a cargo area adjacent the vehicle when the spare tire carrier is in the open position.

In a further non-limiting embodiment of any of the foregoing motor vehicles, the lens arrangement is configured to direct light from the first light source to the section of the rear bumper when the spare tire carrier is closed, and the lens arrangement is configured to direct light from the at least one second light source to the cargo area when the spare tire carrier is closed.

In a further non-limiting embodiment of any of the foregoing motor vehicles, the light assembly includes a sensor configured to generate a signal indicative of whether the spare tire carrier is open or closed.

In a further non-limiting embodiment of any of the foregoing motor vehicles, the sensor is a capacitive sensor.

In a further non-limiting embodiment of any of the foregoing motor vehicles, the vehicle includes a controller configured to selectively activate either the first light source or the at least one second light source based on the signal from the sensor.

In a further non-limiting embodiment of any of the foregoing motor vehicles, the lens arrangement includes an outer housing and a plurality of optical components, with each optical component arranged between the outer housing and a respective one of the first and second light sources.

In a further non-limiting embodiment of any of the foregoing motor vehicles, the optical components are light tubes.

In a further non-limiting embodiment of any of the foregoing motor vehicles, the vehicle includes a filter between the outer housing and one of the optical components associated with the at least one second light source. The filter is arranged such that light passing through the filter projects a logo onto a ground surface adjacent the cargo area.

In a further non-limiting embodiment of any of the foregoing motor vehicles, the first light source and the at least one second light source are provided by light-emitting diodes mounted to a printed circuit board.

In a further non-limiting embodiment of any of the foregoing motor vehicles, the printed circuit board is mounted to the spare tire carrier by way of a polymer having a thermal conductivity of greater than about 10 watts per meter-Kelvin (W/m-K).

A method according to an exemplary aspect of the present disclosure includes, among other things, illuminating a license plate mounted to a bumper of a vehicle using a light assembly mounted to a spare tire carrier.

In a further non-limiting embodiment of the foregoing method, the light assembly includes a first light source and a second light source, and the method further includes illuminating the license plate with a first light source when the spare tire carrier is closed, and illuminating a cargo area adjacent the vehicle with a second light source mounted to the spare tire carrier when the spare tire carrier is open.

In a further non-limiting embodiment of any of the foregoing methods, the second light source is one of a plurality of second light sources, and the method further includes filtering light from one of the second light sources such that light passing through the filter projects a logo on a ground surface adjacent the cargo area.

DETAILED DESCRIPTION

This disclosure relates to a motor vehicle with a light assembly configured to illuminate a license plate, and a corresponding method. In one example motor vehicle, the vehicle includes a rear bumper with a section configured to support a license plate, a spare tire carrier, and a light assembly mounted to the spare tire carrier. The light assembly is configured to illuminate the section of the rear bumper, thereby illuminating a license plate (when present).

Among other benefits, the disclosed arrangement allows for illumination of a license plate regardless of a particular bumper design. In other words, since the light assembly is not mounted to the bumper, the bumper does not need to be designed to support a light assembly. The light assembly can also be powered by a wire harness already present within the spare tire carrier, because the spare tire carrier may have already incorporated wire harness configured for use with a rear backup camera. Further, the spare tire carrier acts as a heat sink for the light assembly, thereby eliminating the need for a separate heat sink. Thus, the disclosed arrangement reduces component parts, which in turn reduces cost and overall weight of the vehicle. These and other benefits will be appreciated from the below description.

Figure 1:
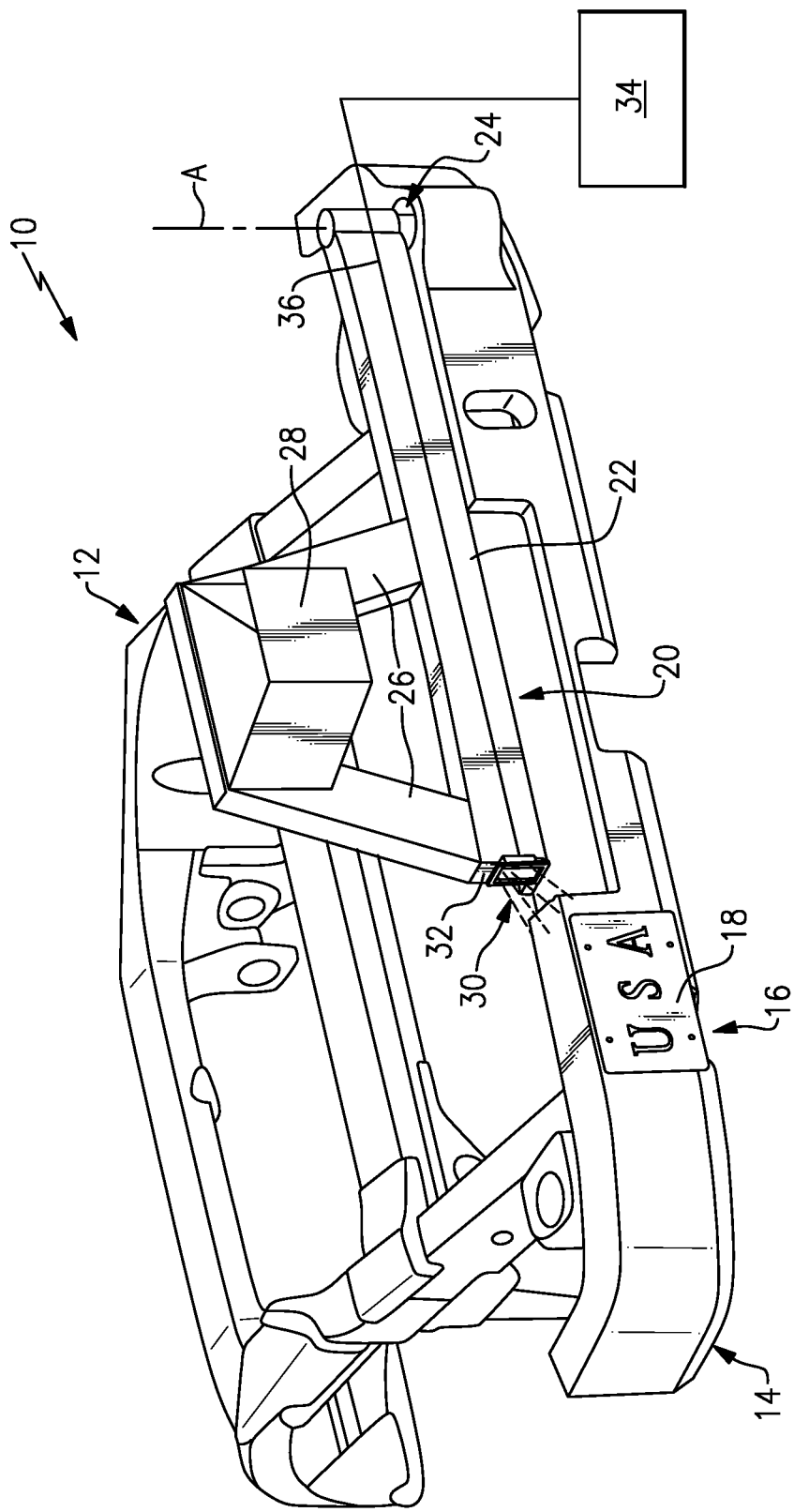
FIG. 1 is a rear-perspective view of a section of a motor vehicle, and in particular illustrates a light assembly mounted to a spare tire carrier.

Referring to the drawings, FIG. 1 is a rear-perspective view of a section of a motor vehicle 10. In particular, FIG. 1 illustrates a rear portion of a frame 12 of the motor vehicle 10. A rear bumper 14 is mounted to the frame 12. The rear bumper 14 may be made of plastic or a metallic material, as examples. The rear bumper 14 spans the width of the vehicle 10 and is configured to absorb impact in a collision. In this example, the rear bumper 14 includes a section 16 configured to support a license plate 18. In FIG. 1, a license plate 18 is mounted to the section 16 by way of a plurality of fasteners, such as screws.

In this example, the section 16 is off-centered, meaning the section 16 is closer to one side of the rear bumper 14 than the other. In particular, the section 16 is closer to the left-hand side of the rear bumper 14, relative to the perspective of FIG. 1. This position of the section 16, and in turn the license plate 18, provides a certain aesthetic appeal to the vehicle 10. The off-centered position of the section 16 also prevents a view of the license plate 18 from being blocked by a spare tire carrier 20, or a tire carried on the spare tire carrier 20.

The spare tire carrier 20 includes an arm 22 rotatably mounted to the rear bumper 14, in this example, by way of a hinge 24. The arm 22 has a longitudinal direction extending substantially parallel to the rear bumper 14. The arm 22 is configured to swing relative to the rear bumper 14 (and remainder of the vehicle 10) about an axis A by way of the hinge 24. The axis A extends in a direction substantially perpendicular to the length of the arm 22.

Generally opposite the hinge 24, the spare tire carrier 20 includes two support arms 26 projecting upward (relative to FIG. 1) from the arm 22. The support arms 26 support a tire mount 28, which is configured to support a spare tire.

The spare tire carrier 20 is shown in a closed position in FIG. 1. In the closed position, the spare tire carrier 20 is in close proximity to a rear of the vehicle 10. At this point, it should be noted that the vehicle 10 may be a sport utility vehicle (SUV), truck, or another type of vehicle. The vehicle 10 may include a rear liftgate or tailgate providing access to a cargo area of the vehicle. In order to open the rear liftgate or tailgate, the spare tire carrier 20 is first opened, by rotating the spare tire carrier 20 about the axis A. In one example, the spare tire carrier 20 is opened by being rotated at least 90° relative to the closed position of FIG. 1.

Figure 2:
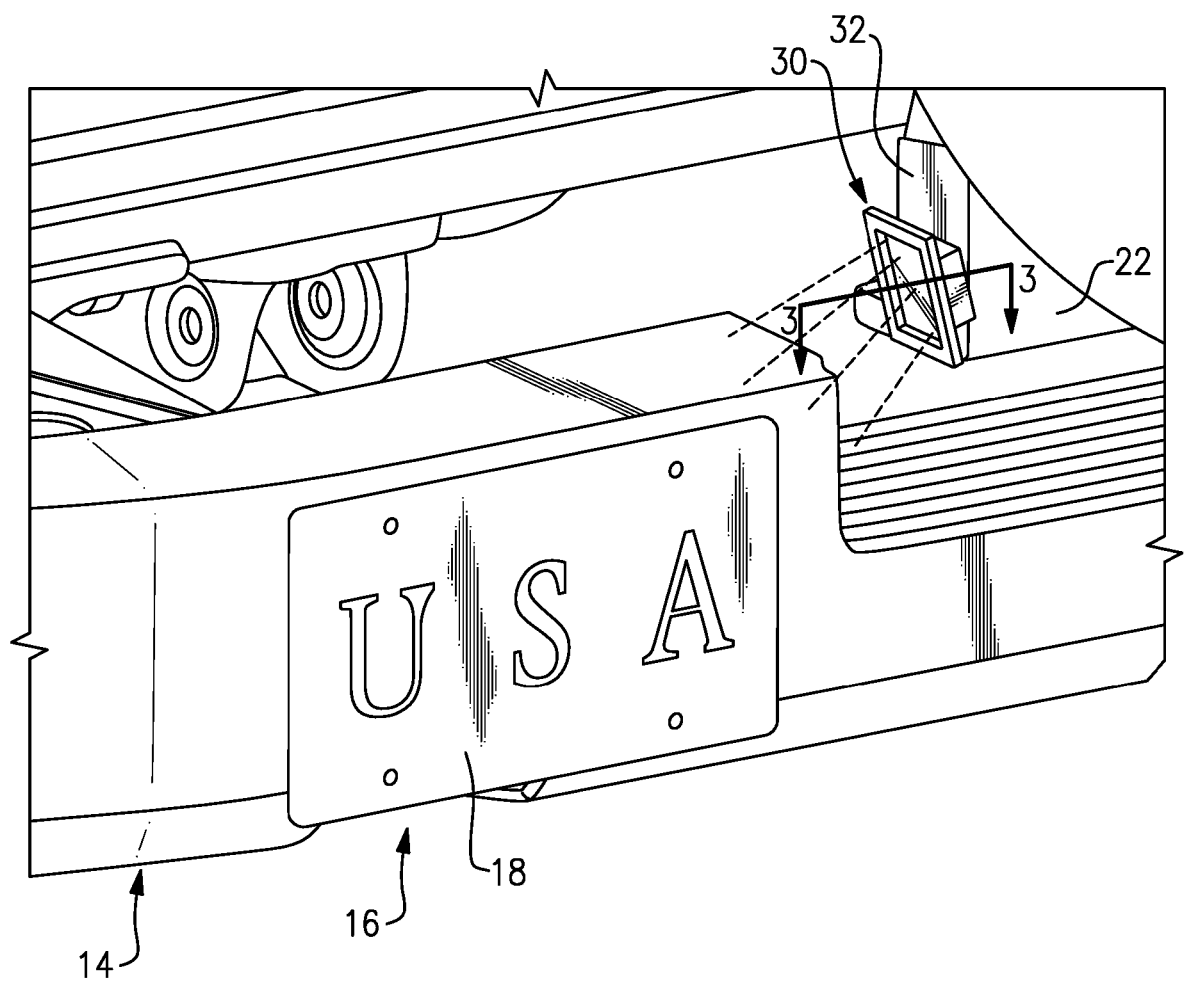
FIG. 2 is a close-up view of the light assembly of FIG. 1.

With joint reference to FIGS. 1 and 2, a light assembly 30 is mounted to the spare tire carrier 20 and configured to illuminate the section 16 of the rear bumper 14, and a license plate 18 (when present). In particular, the light assembly 30 is mounted to a free end 32 of the arm 22. The free end 32 is generally opposite the hinge 24. In this example, when the spare tire carrier 20 is closed, the free end 32 is positioned rearward, upward, and to the right-hand side (with all directional terms used relative to the orientation of FIGS. 1 and 2) of the section 16. The light assembly 30 is mounted to the arm 22 such that it is configured to illuminate the section 16. In particular, the light assembly 30 is configured to direct light forward, downward, and to the left-hand side to illuminate the section 16.

The details of the light assembly 30 will be discussed in more detail below. In general, however, the light assembly 30 includes a plurality of electronic and optical components. To this end, the light assembly 30 is electrically coupled to a controller 34, which is shown schematically in FIG. 1. The controller 34 could be part of an overall vehicle control module, such as a vehicle system controller (VSC), or could alternatively be a stand-alone controller separate from the VSC. Further, the controller 34 may be programmed with executable instructions for interfacing with and operating the various components of the vehicle 10. The controller 34 additionally includes a processing unit and non-transitory memory for executing the various control strategies and modes of the vehicle system.

The controller 34 may be electrically coupled to the light assembly 30 via a wire harness 36, which is shown schematically in FIG. 1. The wire harness 36 may be routed through the arm 22. The wire harness 36 is configured to provide power to the light assembly 30, and to communicate information and commands between the light assembly 30 and the controller 34. Further, the wire harness 36 may be the same wire harness electrically coupled to a rear backup camera (not shown) of the vehicle 10. The rear backup camera may be mounted to the spare tire carrier 20. In this way, the light assembly 30 does not require a dedicated wiring harness, thereby reducing the number of component parts on the vehicle 10.

The license plate 18 in FIG. 1 is an ornamental plate, including the letters "USA," which is an abbreviation for the United States of America. It should be understood that this disclosure is not limited to any particular type of license plate, and extends to ornamental license plates and license plates issued by government bodies for vehicle identification purposes. The term "license plate" as used herein is inclusive of "number plates" and "registration plates."

Figure 3:
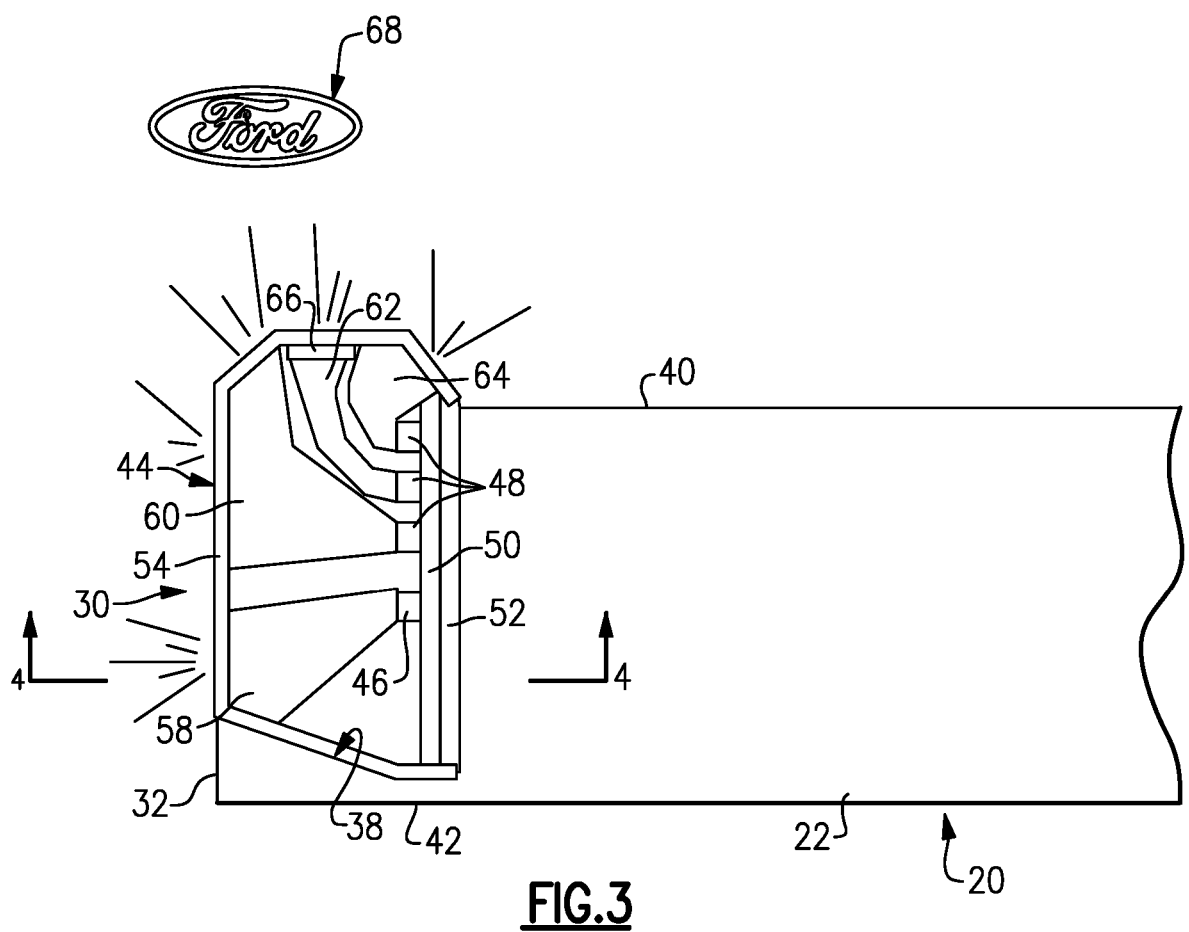
FIG. 3 is a cross-sectional view of the light assembly, taken along line 3-3 in FIG. 2.
Figure 4:
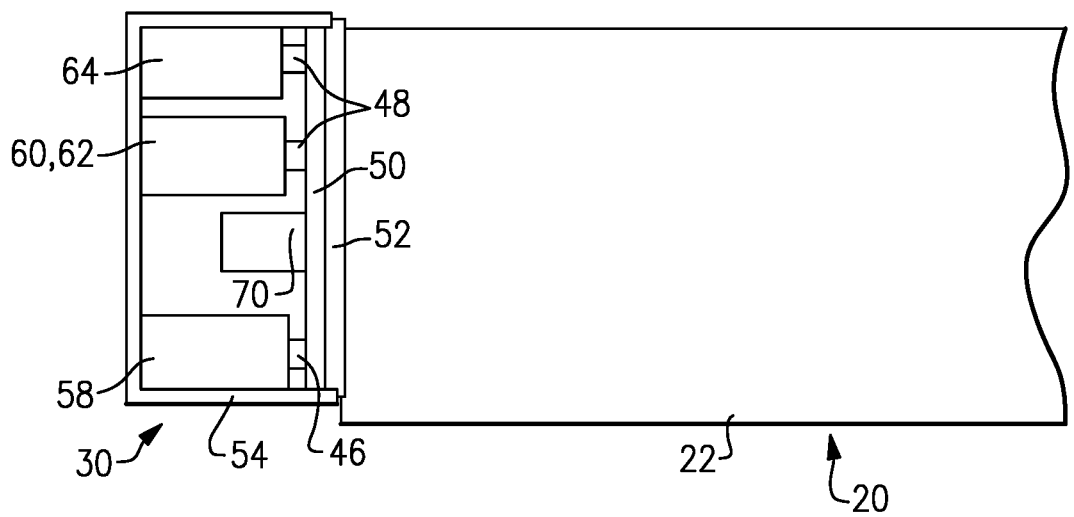
FIG. 4 is a cross-sectional view of the light assembly, taken along line 4-4 in FIG. 3.

FIG. 3 is a cross-sectional view taken along line 3-3 from FIG. 2, and illustrates the arm 22 and the light assembly 30 from a top view. FIG. 4 is a cross-sectional view taken along line 4-4 from FIG. 2, and illustrates the arm 22 and light assembly 30 from a rear view.

With joint reference to FIGS. 3 and 4, the light assembly 30 is mounted at least partially within a recess 38 of the spare tire carrier 20. In this example, substantially the entire light assembly 30 is within the recess 38. In other examples, the entire light assembly 30 is within the recess 38. The recess 38 is a cavity formed in the free end 32 of the arm 22. The recess 38, in this example, extends to a front face 40 of the arm 22, but does not extend to a rear face 42 of the arm 22. In this way, the rear face 42 of the arm 22 covers at least a portion of the light assembly 30, and thus shields the light assembly 30 from exposure to the elements and potential damage. While not required in all examples, the recess 38 may be coated with light-reflective material.

The light assembly 30 includes a lens arrangement 44 including at least one optical element configured to direct light from a light source toward the section 16. In this disclosure, the light assembly 30 includes a first light source 46, which is configured to generate light that the lens arrangement 44 directs toward the section 16. The light assembly 30 further includes a plurality of second light sources 48, which are configure to generate light that is directed elsewhere, as will be explained below. While only one first light source 46 is shown, it should be understood that this disclosure extends to light assemblies with additional light sources configured to generate light that is directed to the section 16. Further, while three second light sources 48 are shown, it should be understood that this disclosure extends to light assemblies with at least one second light source.

In one example of this disclosure, the first and second light sources 46, 48 are each provided by a light emitting diode (LED). The LEDs are mounted and electrically coupled to a printed circuit board (PCB) 50. The PCB 50 is electrically coupled to the controller 34, and the first and second light sources 46, 48 are operable in response to instructions from the controller 34.

The spare tire carrier 20, which may be made of aluminum (Al), is an effective heat sink for the light assembly 30. In one example, in order to better-conduct the heat generated by the light assembly 30, the PCB 50 is mounted to the spare tire carrier 20 via a thermally conductive polymer material 52. The polymer material 52 has a thermal conductivity of greater than about 10 watts per meter-Kelvin (W/m-K). In a particular example, the polymer material 52 has a thermal conductivity of about 14 W/m-K. These values are in stark contrast to the thermal conductivity of ordinary polymer materials, which are typically around 0.5 W/m-K or less. One known thermally conductive polymer material is Cool-Poly®, made commercially available by Celanese Corporation.

The lens arrangement 44 includes an outer housing 54 and a plurality of optical components. The outer housing 54 may be sonically welded to the PCB 50 and/or the polymer material 52. In this example, the lens arrangement 44 includes a plurality of individual optical components, with each optical component provided between the outer housing 54 and a respective one of the first and second light sources 46, 48. In the illustrated example, there are four optical components 58, 60, 62, 64. Each of the optical components 58, 60, 62, 64 is positioned between the outer housing 54 and a respective one of the first and second light sources 46, 48.

The term "optical components" is used to refer to optical structures configured to direct light in a particular manner. The optical components 58, 60, 62, 64 are light tubes in one example. In another example, the optical components 58, 60, 62, 64 are lenses or other optical structures. The optical components 58, 60, 62, 64 may be made of a glass material, an acrylic material, or polymethyl methacrylate (PMMAC), as examples.

In the illustrated example, the lens arrangement 44 includes a filter 66 between one of the optical components and the outer housing 54. The filter 66 is configured to filter light from the second light source 48 associated with the optical component 62, in this example, to project a logo 68 on a ground surface. In this way, light passing through the filter 66 provides a puddle light in the image of the logo 68.

In FIG. 3, the logo 68 is the iconic and world-renowned blue oval logo of the Ford Motor Company. The logo 68 may be any other type of logo or image, including the image associated with a particular make or model of vehicle, including, as examples, the Lincoln Motor Company logo or an image representative a Ford Mustang (e.g., a horse). The logo 68 may be another image or logo altogether. This disclosure extends to other sorts of images and designs, and is not limited to logos.

The controller 34 is configured to command the PCB 50 to activate certain of the first and second light sources 46, 48 depending on whether the spare tire carrier 20 is open or closed, in this disclosure. In order to determine whether the spare tire carrier 20 is open or closed, the controller 34 is configured to receive a signal from a sensor indicative of whether the spare tire carrier 20 is open or closed.

One such sensor 70 is illustrated in FIG. 4. The sensor 70 is a capacitive sensor, and may further be a spring steel capacitive sensor. In one example, the sensor 70 is configured to generate a signal when a latch of the spare tire carrier 20 has engaged a striker mounted to a body of the vehicle 10. The controller 34 is configured to interpret this signal and conclude, when the signal is present, that the spare tire carrier 20 is closed. This disclosure is not limited to this particular control scheme and extends to other techniques for determining whether the spare tire carrier 20 is open or closed. For example, the sensor 70 could be replaced by a mechanical plunger switch.

Figure 5:
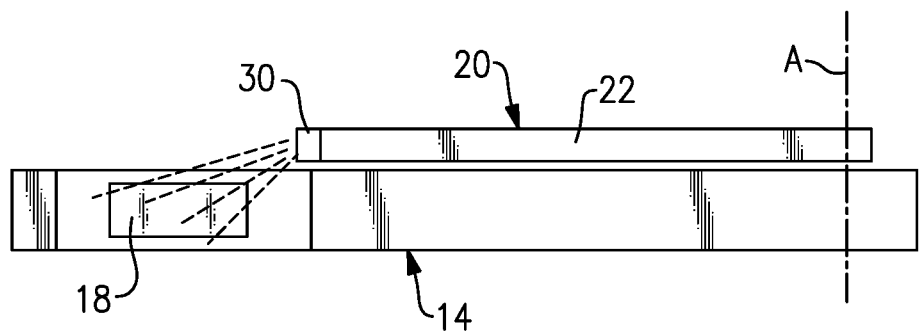
FIG. 5 is a schematic view of the spare tire carrier in a closed position, with the light assembly illuminating a license plate.
Figure 6:
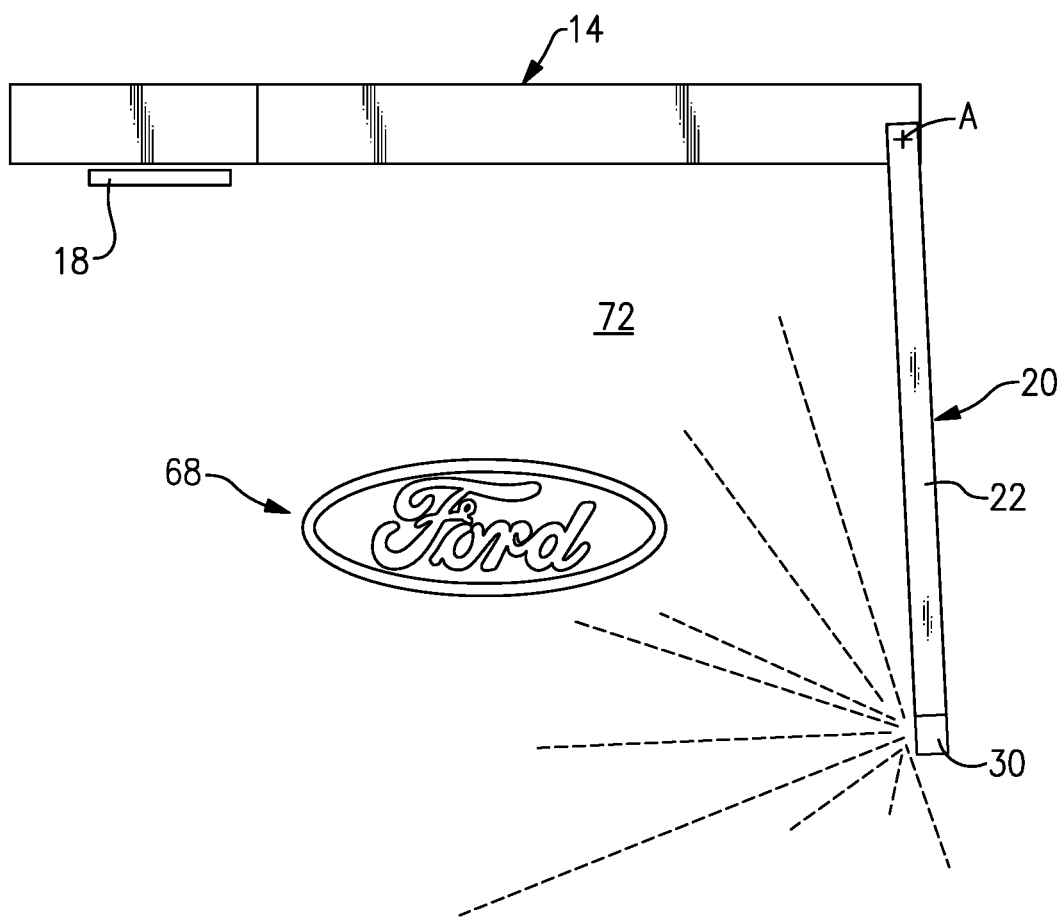
FIG. 6 is a schematic view of the spare tire carrier in an open position, with the light assembly illuminating a cargo area adjacent the vehicle.

FIGS. 5 and 6 schematically illustrate the spare tire carrier 20 in closed and open positions, respectively. A method of use of this disclosure will now be described relative to FIGS. 5 and 6.

In general, the controller 34 is configured to command the light assembly 30 to illuminate the section 16 of the rear bumper 14, and in turn the license plate 18, when the spare tire carrier 20 is closed, as shown in FIG. 5. When the spare tire carrier 20 is open, however, the controller 34 is configured to command the light assembly 30 to illuminate a cargo area 72 (i.e., a loading area) adjacent the rear of the vehicle 10, as shown in FIG. 6. Thus, the light assembly 30 is not only configured to illuminate the section 16, but the light assembly 30 also provides light adjacent the cargo area 72 of the vehicle 10.

In particular, relative to FIGS. 3-5, when the spare tire carrier 20 is closed, the controller 34 receives a signal from the sensor 70 indicative of the spare tire carrier 20 being closed. In response, the controller 34 commands the PCB 50 to activate the first light source 48 only. The optical component 58 directs light from the first light source 46 to the section 16, thereby illuminating the license plate 18. When the spare tire carrier 20 is closed, the second light sources 48 are not activated.

With reference to FIGS. 3, 4, and 6, when the spare tire carrier 20 swings open, the sensor 70 ceases sending the signal to the controller 34. In response, the controller 34 determines that the spare tire carrier 20 is open, and commands the PCB 50 to activate the second light sources 48.

The second light sources 48 direct light to the cargo area 72 via the optical components 60, 62, 64, as shown in FIG. 6. Again, light passing through the filter 66 projects the logo 68 on a ground surface adjacent the vehicle 10. While not necessary, the first light source 46 may also be activated when the spare tire carrier 20 is open in order to provide additional light.

The controller 34 may be in communication with an environmental light sensor, in order to determine whether the first and second light sources 46, 48 are required. For example, in broad daylight, the controller 34 may determine that ambient light conditions are sufficient and that the light sources 46, 48 are not required. In this way, the controller 34 is configured to override the method described relative to FIGS. 5 and 6. A user may also selectively activate and deactivate the light assembly 30, as desired.

It should be understood that directional terms such as "forward," "rearward," "upward," "downward," etc., are used herein relative to the normal operational attitude of the vehicle 10, and are used for purposes of explanation only and should not be deemed limiting. Further, it should be understood that terms such as "about," "substantially," and "generally" are not intended to be boundaryless terms, and should be interpreted consistent with the way one skilled in the art would interpret those terms. It should be understood that certain aspects of the disclosure are exaggerated in the Figures for purposes of illustration only.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle, comprising:
   a rear bumper including a section configured to support a license plate;
   a spare tire carrier; and
   a light assembly mounted to the spare tire carrier, the light assembly configured to illuminate the section of the rear bumper,
   wherein the light assembly includes a first light source and a lens arrangement, the lens arrangement configured to direct light from the first light source to the section of the rear bumper,
   wherein the motor vehicle includes at least one second light source mounted to the spare tire carrier,
   wherein the spare tire carrier is moveable between an open position and a closed position,
   wherein the first light source is configured to illuminate the section of the rear bumper when the spare tire carrier is in the closed position, and
   wherein the at least one second light source is configured to illuminate a cargo area adjacent the vehicle when the spare tire carrier is in the open position.

2. The motor vehicle as recited in claim 1, wherein:
   the lens arrangement is configured to direct light from the first light source to the section of the rear bumper when the spare tire carrier is closed, and
   the lens arrangement is configured to direct light from the at least one second light source to the cargo area when the spare tire carrier is closed.

3. The motor vehicle as recited in claim 2, wherein the light assembly includes a sensor configured to generate a signal indicative of whether the spare tire carrier is open or closed.

4. The motor vehicle as recited in claim 3, wherein the sensor is a capacitive sensor.

5. The motor vehicle as recited in claim 3, further comprising a controller configured to selectively activate either the first light source or the at least one second light source based on the signal from the sensor.

6. The motor vehicle as recited in claim 2, wherein the lens arrangement includes an outer housing and a plurality of optical components, each optical component arranged between the outer housing and a respective one of the first and second light sources.

7. The motor vehicle as recited in claim 6, wherein the optical components are light tubes.

8. The motor vehicle as recited in claim 6, further comprising:
   a filter between the outer housing and one of the optical components associated with the at least one second light source, wherein light passing through the filter projects a logo onto a ground surface adjacent the cargo area.

9. The motor vehicle as recited in claim 2, wherein the first light source and the at least one second light source are provided by light-emitting diodes mounted to a printed circuit board.

10. The motor vehicle as recited in claim 9, wherein the printed circuit board is mounted to the spare tire carrier by way of a polymer having a thermal conductivity of greater than about 10 watts per meter-Kelvin (W/m-K).

11. A method, comprising:
    illuminating a license plate mounted to a rear bumper of a vehicle using a light assembly mounted to a spare tire carrier, wherein the light assembly includes a first light source and a second light source, the method further comprising:
    illuminating the license plate with a first light source when the spare tire carrier is closed; and
    illuminating a cargo area adjacent the vehicle with a second light source mounted to the spare tire carrier when the spare tire carrier is open.

12. The method as recited in claim 11, wherein the second light source is one of a plurality of second light sources, and wherein the method further comprises:
    filtering light from one of the second light sources such that light passing through the filter projects a logo on a ground surface adjacent the cargo area.

* * * * *